United States Patent [19]

Jeong

[11] Patent Number: 5,802,158
[45] Date of Patent: Sep. 1, 1998

[54] METHOD AND APPARATUS FOR PROVIDING AN ALARM CALL TO A REMOTELY LOCATED USER USING A DISA LINE IN A PRIVATE EXCHANGE

[75] Inventor: Jong-Geal Jeong, Taegu, Rep. of Korea

[73] Assignee: SamSung Electronics Co., Ltd., Kyungki-do, Rep. of Korea

[21] Appl. No.: 660,942

[22] Filed: Jun. 10, 1996

[30] Foreign Application Priority Data

Jun. 12, 1995 [KR] Rep. of Korea ............... 1995/15396

[51] Int. Cl.⁶ ............................................. H04M 3/42
[52] U.S. Cl. .............. 379/198; 379/93.02; 379/201; 379/209; 368/13
[58] Field of Search ............... 379/33, 40, 46, 379/67, 69, 93.02, 93.03, 142, 188, 198, 201, 209, 251, 252, 202, 283, 257, 256, 354, 355, 233, 232, 231, 234; 368/13

[56] References Cited

U.S. PATENT DOCUMENTS

| | | | |
|---|---|---|---|
| 1,302,767 | 5/1919 | Clausen et al. | 379/201 |
| 3,502,818 | 3/1970 | Oden et al. | 379/211 |
| 3,504,121 | 3/1970 | Riley | 379/69 |
| 3,614,329 | 10/1971 | Topfer et al. | 379/142 |
| 3,777,065 | 12/1973 | Galian et al. | 379/159 |
| 4,072,825 | 2/1978 | McLay et al. | 379/33 |
| 4,475,009 | 10/1984 | Rais et al. | 379/211 |
| 4,670,628 | 6/1987 | Boratgis et al. | 379/69 |
| 4,876,717 | 10/1989 | Barron et al. | 380/25 |
| 4,955,047 | 9/1990 | Morganstein et al. | 379/112 |
| 4,969,185 | 11/1990 | Dorst et al. | 379/209 |
| 5,040,208 | 8/1991 | Jolissaint | 379/209 |
| 5,175,760 | 12/1992 | Ohashi et al. | 379/67 |
| 5,373,488 | 12/1994 | Lidor | 379/40 |
| 5,448,627 | 9/1995 | Ueno et al. | 379/67 |
| 5,493,611 | 2/1996 | Hubert | 379/387 |
| 5,533,100 | 7/1996 | Bass et al. | 379/209 |

OTHER PUBLICATIONS

Newton, "Newton's Telecom Dictionary, 8th Expanded and Updated Edition," Flatiron Publishing, Inc., pp. 329 and 330, Nov. 1994.

Primary Examiner—Krista Zele
Assistant Examiner—Scott Wolinsky
Attorney, Agent, or Firm—Robert E. Bushnell, Esq.

[57] ABSTRACT

A method and apparatus for providing an alarm call using a DISA line in a private exchange includes: storing a password for limiting the use of the DISA line; externally connecting the DISA line to thereby receive an alarm call request; receiving an alarm call request and password from a user when the user is connected to the DISA line; storing time and telephone number to which the alarm call is to be sent, if the password input by the user is identical to the stored password; periodically comparing the stored time with a current time; and dialing the stored telephone number to provide an alarm call when the current time is identical to the stored time.

6 Claims, 3 Drawing Sheets

METHOD AND APPARATUS FOR PROVIDING AN ALARM CALL TO A REMOTELY LOCATED USER USING A DISA LINE IN A PRIVATE EXCHANGE

CLAIM OF PRIORITY

This application makes reference to, incorporates the same herein, and claims all benefits accruing under 35 U.S.C §119 from an application entitled METHOD FOR PERFORMING ALARM CALL USING DISA LINE I PRIVATE EXCHANGE earlier filed in the Korean Industrial Property Office on 12 Jun. 1995 and there assigned Ser. No. 15396/1995.

BACKGROUND OF THE INVENTION

1. Field of the Invention

The present invention relates to a method and apparatus for providing an alarm call to a remotely located user, using a DISA line in a private exchange.

2. Description of the Related Art

Along with the development of communications technology, there have been required a variety of communication system services. Many communication methods for a private exchange used in an office have been presented.

In a conventional DISA (direct inward system access) for a private exchange, the system is externally accessed to enable a long-distance call via the system's other line. Typically, this function is used merely to charge the cost of the long-distance call to the system owner. If the user needs an alarm call at an accurate time during a business trip or traveling, the conventional DISA is incapable of providing such an alarm call.

Rais, et al., U.S. Pat. No. 4,475,009 discloses a system in which a remotely located user can program a desired call forwarding telephone number after providing a predetermined identification code for security purposes.

Jolissaint and Ohashi, et al., U.S. Pat. No. 5,040,208 and 5,175,760 disclose telephone apparatus which are programed so as to call back a stored telephone number at a programed time.

I have discovered that contemporary designs for communication systems as represented by these references, fail to provide a telephone system in which a use remotely enters a telephone number and a time such that the system calls back the user at the time and telephone number entered by the user so as to provide an alarm indication to the user. In addition, I have noticed that contemporary designs have been unable to employ the benefits the use of DISA lines are neither taught nor suggested or discussed in the aforementioned references.

SUMMARY OF THE INVENTION

Therefore, in order to overcome the drawbacks of the prior art, it is an object of the present invention to provide an improved process and telecommunication system.

It is another objet to provide a process and apparatus for providing an alarm call using a private exchange's DISA line.

It is still another object to provide a process and telecommunication system able to compatibly use direct inward system access.

To accomplish the object of the present invention, there is provided a process and apparatus for providing an alarm call to a remotely located user using DISA line in a private exchange which includes: storing a password for limiting the use of the DISA line; externally connecting the DISA line to thereby receive an alarm call request from the remotely located user; inputting an alarm call function request code and password when request from the remotely located user to the DISA line. The time and telephone number to which the alarm call is to be sent are stored, if the password input by the remotely located user is identical to the stored password the time and telephone number being input by the remotely located user. Periodically the stored time is compared with a current time; and dialing the stored telephone number to provide the requested alarm call to the user, if the current time is identical to the stored time.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements or components, wherein.

DETAILED DESCRIPTION OF THE PREFERRED EMBODIMENT

Figure 1:
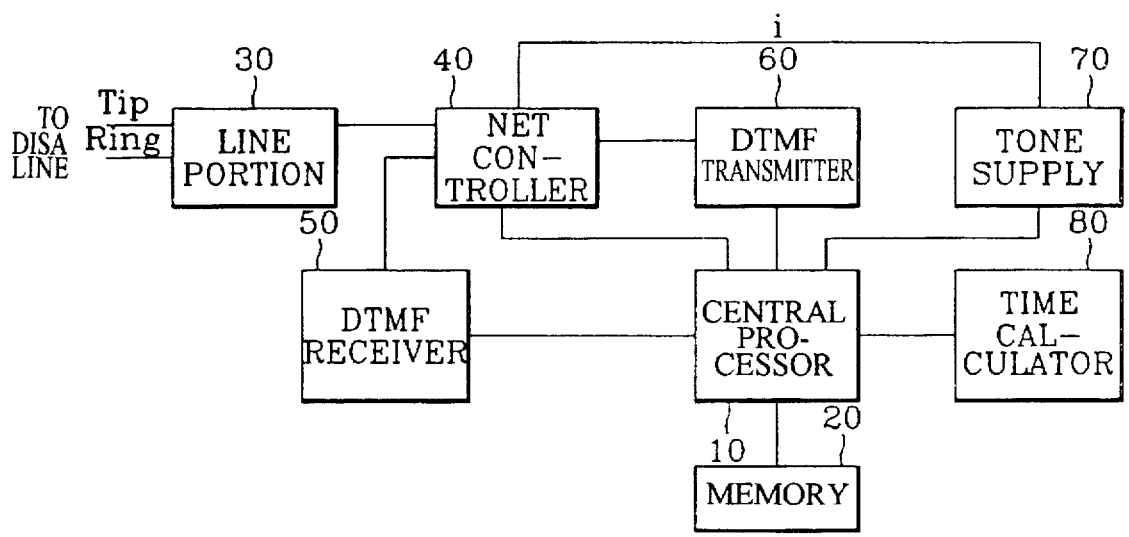
FIG. 1 is a block diagram of a private exchange adapted to the present invention.

Referring to FIG. 1, a private exchange applied to the present invention comprises: a central processor 10 for detecting an external input and for transmitting a control signal to respective blocks; a memory 20 for receiving the control signal from the central processor for storing a password and a telephone number to which an alarm call is to be sent; a time calculator 80 for receiving the control signal from the central processor 10 to periodically compare a time stored in memory 20 with the current time, a net controller 40 for receiving the control signal from the central processor 10 to send the telephone number stored in memory 20, and a line portion 30 forming a communication loop with net controller 40.

Figure 2:
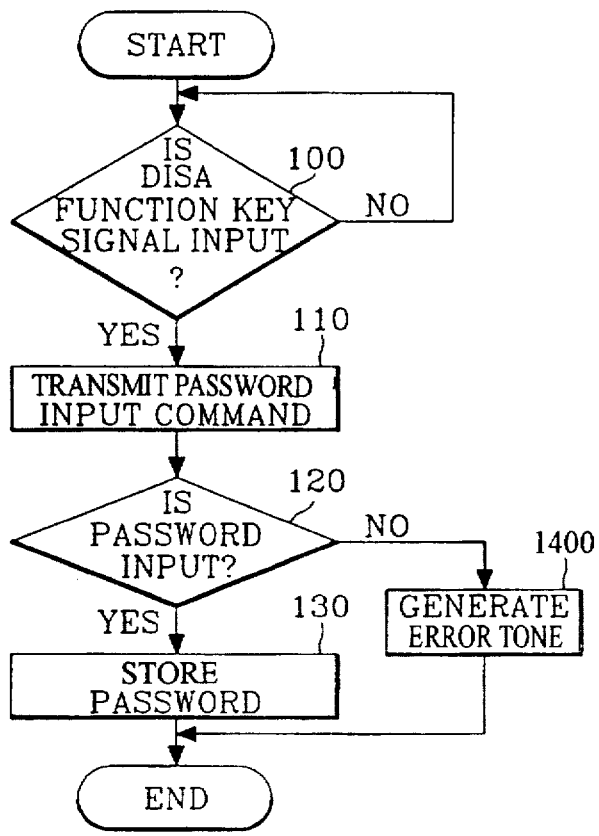
FIG. 2 is a flowchart illustrating the storing of a password to access a DISA line in accordance with the present invention.

Referring to FIG. 2, a method of storing a password to access a DISA line comprises the steps of: determining whether or not a DISA function key signal is present; if so, displaying a password input command; then determining whether or not the password has been input and if so, storing the password and if not, generating an error tone.

Figure 3:
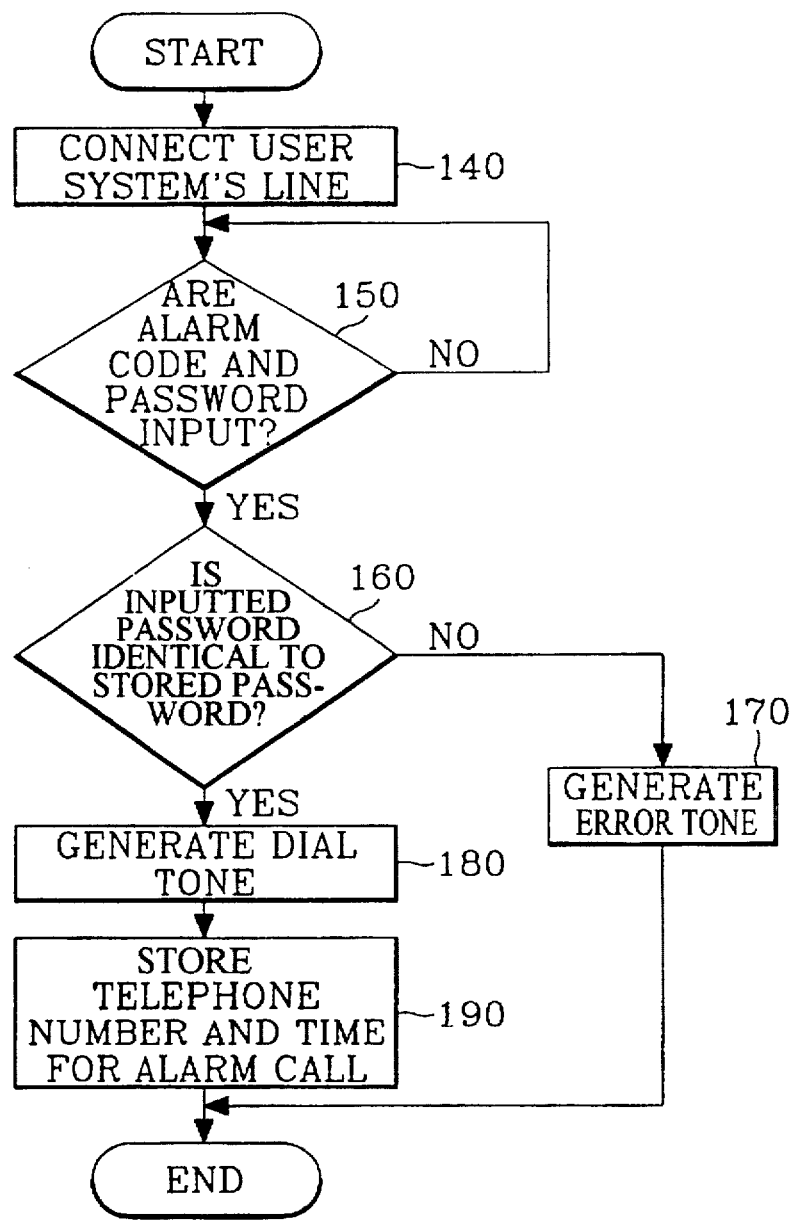
FIG. 3 is a flowchart illustrating the storing of a telephone number and a time to provide an alarm call to a user using the DISA line in accordance with the present invention.

Referring to FIG. 3, a method and apparatus for storing a telephone number and alarm time in accordance with the present invention comprises: externally connecting the DISA line of the exchange in order to receive an alarm call request; receiving an alarm call code and password when connected to the DISA line; and storing an alarm call time and telephone number to which the alarm call is to be sent.

Figure 4:
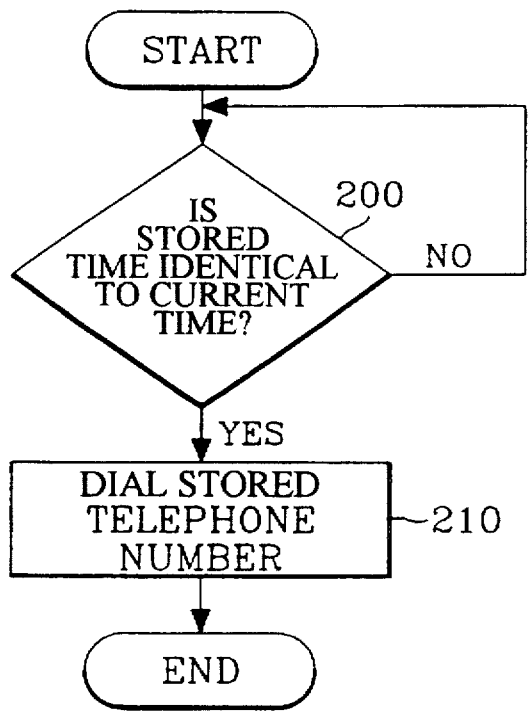
FIG. 4 is a flowchart illustrating the generation of an alarm call to a user's telephone in accordance with the present invention.

Referring to FIG. 4, a method for generating the alarm call to the user's telephone in accordance with the present invention comprises the steps of: periodically comparing the current time with the stored alarm call time; and dialing the stored telephone number when the current time is found to be identical with the stored alarm call time in the comparison step.

The present invention will be described in more detail with reference to FIGS. 2, 3 and 4 as well as to FIG. 1.

In initial step 100, central processor 10 of the exchange determines whether or not a DISA function key signal has been generated by a remote user. When the DISA function key signal is present, the central processor 10 generates data for transmitting a password input command to the user in step 110.

In step 120, the central processor 10 determines whether or not the password has been input. If the password has been input, the central processor 10 stores the input password in memory 20 in step 130. If not, an error tone is generated in step 1400.

The control sequence of storing a telephone number and alarm time for generating the alarm call to the user after the password storage as explained above is discussed below.

First of all, in step 140, if the user dials the telephone number allocated to the DISA line and its ringing is detected, the central processor 10 connects the DTMF receiver 50 to the DISA line via the line portion 30 and net controller 40 in order to detect DTMF signals inputted by the user.

In step 150, the central processor 10 determines whether or not the user's alarm code and password have been input. If so, the password is compared with the stored password in step 160. If the input password is not identical to the stored password, an error tone is generated by the tone supply 70 to disconnect the DISA line and then returns the exchange to its initial state in step 170. However, if the input password is identical to the stored password, in step 180, the central processor 10 supplies a control signal to a tone supply 70 to generate a tone informing the user to transmit the alarm call telephone number and time. Thereafter, in step 190, the central processor 10 detects and stores an alarm call telephone number and time input by the user in memory 20.

The control sequence for allowing the system to provide an alarm call to the user, after the alarm call telephone number and time have been stored as explained above is described below.

If the stored time and current time are found to be identical in a comparison step 200, in step 210, the central processor 10 reads the telephone number stored in memory 20 to operate the line portion 30. By doing so, the line is connected to a DTMF transmitter 60 which dials the stored telephone number to provide an alarm call to the user.

As described above, the present invention provides a method and apparatus for providing an alarm call to a remotely located user using the DISA line in a private exchange, informing the user located at a long distance of a rising time in the morning or an appointment time.

While the present invention has been described above with reference to the preferred embodiment, it will be appreciated by those skilled in the art that various substitutions and modifications can be made without departing from the spirit and scope of the invention as set forth in the following claims.

What is claimed is:

1. A method for providing an alarm call to a remotely located user using a DISA (direct inward system access) line in a private exchange, comprising the steps of:

storing a password to be used for authorizing use of the DISA line by the remotely located user;

externally connecting the DISA line to thereby receive an alarm call request from the remotely located user;

inputting an alarm call function request code and password when the remotely located user is connected to the DISA line so as to make an alarm call request;

storing a time and telephone number to which the alarm call is to be sent, if the password input by the remotely located user is identical to the stored pass word and a proper alarm call function request code has been input, the time and telephone number being input by the remotely located user;

periodically comparing the stored time with a current time; and dialing the stored telephone number to provide the requested alarm call to the user, if the current time is identical to the stored time.

2. A method as recited in claim 1, wherein the password storing step comprises the substeps of:

determining whether or not a DISA function performing signal input has been received from the user, and if so, transmitting a password input command to the user requesting the user to input a password; and storing the input password if the password is input by the user in response to the password input command being transmitted.

3. A method of storing a telephone number and alarm time to provide an alarm call to a remotely located user using a DISA (direct inward system access) line in a private exchange, said method comprising the steps of:

connecting the DISA line so as to detect a DTMF (dual tone multifrequency) signal if a ringing signal is detected in response to the user dialing a telephone number allocated to the DISA line;

detecting whether or not an alarm call function request code and password have been input after the connection of the user to the DISA line;

determining whether or not a previously stored password is identical to the password which has been input; and storing a telephone number and time to send an alarm call if the stored and input and passwords are identical and a proper alarm call function request code has been input.

4. An apparatus for providing an alarm call to a remotely located user using a DISA (direct inward system access) line in a private exchange, comprising:

a memory for storing a password to be used for authorizing use of the DISA line by the remotely located user;

a means for externally connecting the DISA line to thereby receive an alarm call request from the remotely located user;

a means for inputting an alarm call function request code and password when the remotely located user is connected to the DISA line so as to make an alarm call request;

a comparison means for comparing the input password with the stored password, said memory storing a time and telephone number to which the alarm call is to be sent, if the password input by the remotely located user is found to be identical to the stored password by said comparison means and a proper alarm call function request code has been input the time and telephone number being input by the remotely located user;

another comparison means for periodically comparing the stored time with a current time; and a means for dialing the stored telephone number to provide the requested alarm call to the user, if the current time is found to be identical to the stored time by said another comparison means.

5. An apparatus as recited in claim 4, further comprising:

a means for determining whether or not a DISA function performing signal input has been received from the user, and if so, transmitting a password input command to the user requesting the user to input a password; and a means for commanding of the storing of the input password in said memory if the password is input by the user in response to the password input command transmitted.

6. An apparatus for storing a telephone number and alarm time to provide an alarm call to a remotely located user using a DISA (direct inward system access) line in a private exchange, said apparatus comprising:

a means for connecting the DISA line so as to detect a DTMF (dual tone multifrequency) signal if a ringing signal is detected in response to the user dialing a telephone number allocated to the DISA line;

a means for detecting whether or not an alarm call function request code and password have been input after the connection of the user to the DISA line;

a means for determining whether or not a previously stored password is identical to the password which has been input; and a means for storing a telephone number and time to send an alarm call if the stored and input passwords are identical and a proper alarm call function request code has been input.

* * * * *